UNITED STATES PATENT OFFICE.

WILLIAM ZINSSER, OF NEW YORK, N. Y.

IMPROVEMENT IN COMPOUNDS FOR PRESERVING BEER, &c.

Specification forming part of Letters Patent No. 165,145, dated June 29, 1875; application filed June 2, 1875.

*To all whom it may concern:*

Be it known that I, WILLIAM ZINSSER, of the city, county, and State of New York, have invented a certain new and Improved Compound for Preserving Beer and other Liquids from Souring, of which the following is a specification:

This invention consists in a compound made of salicylic acid and bicarbonate of soda, which, when introduced into beer or other liquids, serves to prevent the formation of acids in said liquids, and assists materially to preserve said liquids in a healthy condition.

In preparing my compound I take salicylic acid, one part, bicarbonate of soda, from eight to sixty parts, the proportion being varied according to the nature of the liquid for which my compound is to be used, and according to the temperature in which said liquid is to be kept.

If I intend to use my compound for preserving milk, for instance, I mix one part of salicylic acid with thirty parts of bicarbonate of soda, and one tea-spoonful of this mixture is sufficient to keep a gallon of milk in a sweet state; but in the hot season it may be desirable to increase the dose or to use a compound containing a greater percentage of salicylic acids.

For the purpose of preserving beer I mix one part of salicylic acid with eight parts of bicarbonate of soda, and one tea-spoonful of this mixture will preserve a quarter-barrel, or seven and one-half gallons, of lager-beer or of ale at the ordinary temperature of from 60° to 66° of Fahrenheit. If the beer is to be exported to southern countries, where it will be exposed to a higher temperature, the dose of my compound must be increased.

By mixing salicylic acid with bicarbonate of soda a compound is produced which dissolves more readily in liquids containing alcohol than pure salicylic acid. Furthermore, bicarbonate of soda is a well-known preservative against souring, and when mixed with salicylic acid the effect is materially improved. Furthermore, mixing salicylic acid with bicarbonate of soda, for the purpose of preserving liquids from souring, is rendered practicable.

What I claim as new, and desire to secure by Letters Patent, is—

A compound for preserving beer and other liquids from souring, made of salicylic acid and bicarbonate of soda mixed together, substantially in the manner and about in the proportion set forth.

In testimony that I claim the foregoing I have hereunto set my hand and seal this 24th day of April, 1875.

WM. ZINSSER. [L. S.]

Witnesses:
W. HAUFF,
E. F. KASTENHUBER.